US012770872B2

(12) United States Patent
Yu et al.

(10) Patent No.: US 12,770,872 B2
(45) Date of Patent: Oct. 20, 2026

(54) METHOD FOR PREPARING TERNARY CATHODE MATERIAL WITH MOLTEN SALT AND USE THEREOF

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Haijun Yu, Foshan (CN); Yinghao Xie, Foshan (CN); Aixia Li, Foshan (CN); Xuemei Zhang, Foshan (CN); Changdong Li, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 497 days.

(21) Appl. No.: 18/371,465

(22) Filed: Sep. 22, 2023

(65) Prior Publication Data

US 2024/0014391 A1 Jan. 11, 2024

Related U.S. Application Data

(63) Continuation of application No. PCT/CN2023/081688, filed on Mar. 15, 2023.

(30) Foreign Application Priority Data

May 19, 2022 (CN) ........................ 202210546053.8

(51) Int. Cl.
*H01M 4/505* (2010.01)
*C01G 53/504* (2025.01)
(Continued)

(52) U.S. Cl.
CPC .......... *H01M 4/505* (2013.01); *C01G 53/504* (2025.01); *C01G 53/506* (2025.01); *H01M 4/525* (2013.01);
(Continued)

(58) Field of Classification Search
CPC ........ C01G 53/50; H01M 4/505; H01M 4/525
See application file for complete search history.

(56) References Cited

U.S. PATENT DOCUMENTS

2005/0019659 A1* 1/2005 Shiozaki ................ C01G 53/50 429/223
2022/0112094 A1* 4/2022 Xiao ...................... C01G 53/50

FOREIGN PATENT DOCUMENTS

CN 107017402 * 8/2017 ........ H01M 10/0525
CN 111682174 A 9/2020
(Continued)

OTHER PUBLICATIONS

Ren-Peng Qing et al., Enhancing the Kinetics of Li-Rich Cathode Materials through the Pinning Effects of Gradient Surface Na + Doping, Adv. Energy Mater., Dec. 12, 2015, pp. 1-6, vol. 6.

*Primary Examiner* — Anthony J Zimmer
*Assistant Examiner* — Eric Scott Sherman
(74) *Attorney, Agent, or Firm* — Westbridge IP LLC

(57) ABSTRACT

The present disclosure discloses a method for preparing a ternary cathode material with a molten salt and use thereof. The method includes: mixing a nickel salt, a cobalt salt, a manganese salt, a metal oxide and an acid liquor to obtain a mixed salt solution; concurrently adding the mixed salt solution, a sodium hydroxide solution and ammonia water to
(Continued)

a base solution to allow a reaction to obtain a precursor; and mixing the precursor, a lithium source and a molten salt, and subjecting a resulting mixture to sintering, water-washing and annealing to obtain the ternary cathode material. In the present disclosure, a bismuth/antimony-doped ternary precursor is prepared, which is sintered with a molten salt, during which bismuth/antimony oxide is melted in the molten salt, then a resulting mixture is washed with water, and annealed to form a coating layer on a surface of the material.

9 Claims, 1 Drawing Sheet

(51) Int. Cl.
*C01G 53/506* (2025.01)
*H01M 4/525* (2010.01)

(52) U.S. Cl.
CPC ...... *C01P 2002/52* (2013.01); *C01P 2004/03* (2013.01); *C01P 2006/40* (2013.01)

(56) References Cited

FOREIGN PATENT DOCUMENTS

| | | | | |
|---|---|---|---|---|
| CN | 113130877 A | | 7/2021 | |
| TW | I392134 | * | 4/2013 | ............ Y02E 60/10 |

* cited by examiner

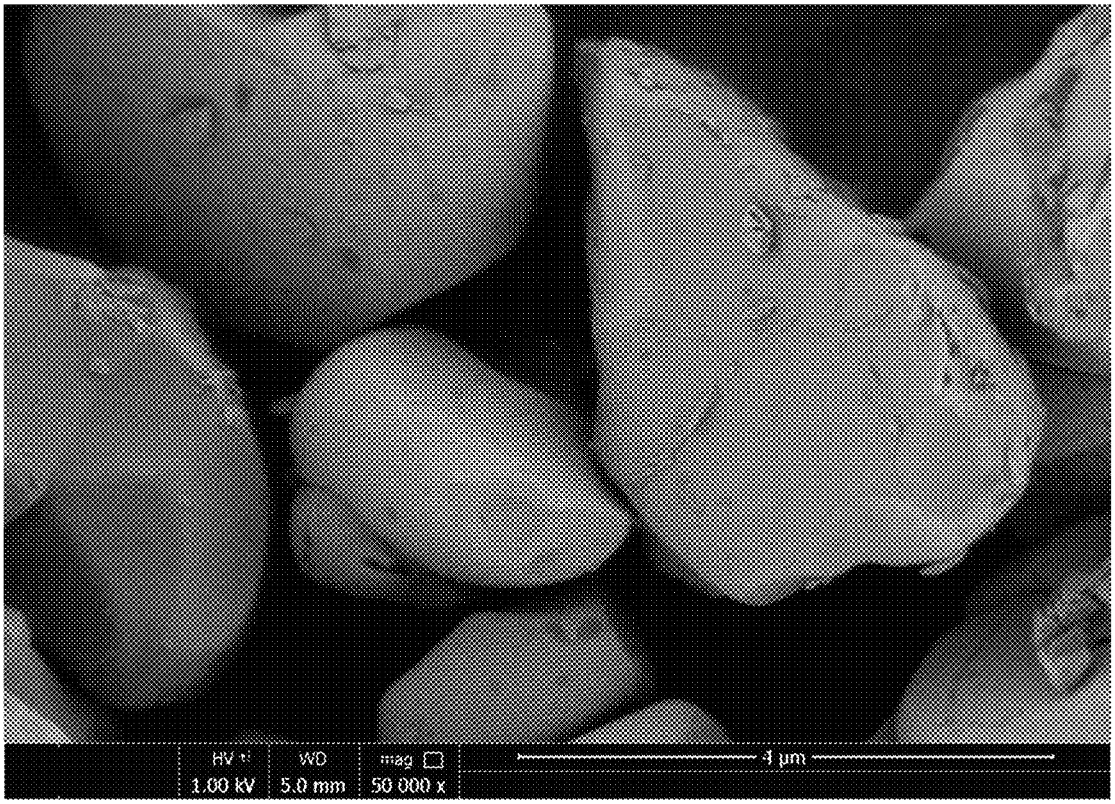
HV
1.00 kV
WD
5.0 mm
mag
50 000 x
4 μm

METHOD FOR PREPARING TERNARY CATHODE MATERIAL WITH MOLTEN SALT AND USE THEREOF

CROSS-REFERENCE TO RELATED APPLICATIONS

The present application is a continuation application of PCT application No. PCT/CN2023/081688 filed on Mar. 15, 2023, which claims the benefit of Chinese Patent Application No. 202210546053.8 filed on May 19, 2022. The contents of all of the aforementioned applications are incorporated by reference herein in their entirety.

TECHNICAL FIELD

The present disclosure belongs to the technical field of cathode materials for lithium-ion batteries, and in particular relates to a method for preparing a ternary cathode material with a molten salt, and use thereof.

BACKGROUND

Lithium-ion batteries are widely used due to their advantages such as prominent cycling performance, high capacity, low price, convenient use, safety, and environmental friendliness. With the increasing market demand for high-performance (such as high-energy-density) batteries and continuous popularization of electric vehicles, the market demand for battery cathode materials has presented a rapid growth trend.

Currently, synthesis methods for cathode materials include a high-temperature solid-phase method, a sol-gel method, a co-precipitation method, a spray-drying method, and the like. The high-temperature solid-phase method involves long roasting time, high energy consumption, uniform mixing, low efficiency, and easy introduction of impurities. The sol-gel method involves use and evaporation of a solvent, resulting in additional consumption of materials and energy, and the sol-gel method requires a long and complicated synthesis process. The co-precipitation method involves complicated synthesis steps and is time-consuming and labor-intensive. The spray-drying method can be used to synthesize nanoscale primary particles, but requires expensive equipment.

The molten-salt method is attracting extensive attention due to its simple process and short reaction time. These lithium-containing cathode materials are generally synthesized with a lithium salt such as LiCl, LiF, $LiCO_3$, LiOH, or $LiNO_3$, which serves as a solvent and provides a lithium source for a target product. A molten salt is mainly used as a solvent and a diffusion medium during the entire reaction process. Reaction raw materials generally each have a specified solubility in a selected salt, such that atomic-scale contact of reactants is achieved in a liquid phase. In addition, reactants have a high diffusion rate in a molten salt, for example, an ion migration rate is in a range from $1\times10^{-5}$ to $1\times10^{-8}$ $cm^2/s$ in a molten salt, but only $1\times10^{-8}$ $cm^2/s$ in a solid phase. The above two effects enable a reaction at a low temperature in a short time. The preparation of a powder material by an existing molten-salt method can improve the crystallinity and tap density of the material, thereby improving the cycling performance and rate performance of a battery. However, there are still few studies on the preparation of a high-performance ternary cathode material by a molten-salt method.

SUMMARY

The present disclosure is intended to solve at least one of the technical problems existing in the prior art. In view of this, the present disclosure provides a method for preparing a ternary cathode material with a molten salt, and use thereof. The ternary cathode material prepared by the method has prominent crystallinity and lattice porosity, which can buffer the volume expansion of the material and improve the cycling stability of the material.

According to an aspect of the present disclosure, a method for preparing a ternary cathode material with a molten salt is provided, including the following steps:

S1: mixing a nickel salt, a cobalt salt, a manganese salt, a metal oxide and an acid liquor to obtain a mixed salt solution, wherein the metal oxide is an oxide of bismuth or an oxide of antimony;

S2: concurrently adding the mixed salt solution, a sodium hydroxide solution and ammonia water to a base solution to allow a reaction, and when a reaction product has a target particle size, conducting solid-liquid separation to obtain a precursor;

S3: mixing the precursor, a lithium source and a molten salt, and subjecting a resulting mixture to ball-milling and then to sintering in an oxygen atmosphere to obtain a sintered material; and S4: subjecting the sintered material to water-washing, drying and annealing to obtain the ternary cathode material.

In some embodiments of the present disclosure, in step S1, the acid liquor is nitric acid. Further, the nitric acid has a mass concentration in a range from 30% to 50%.

In some embodiments of the present disclosure, in step S1, a nickel-cobalt-manganese metal solution containing the nickel salt, the cobalt salt and the manganese salt is first prepared, then the metal oxide and the acid liquor is added to the nickel-cobalt-manganese metal solution, and a total concentration of nickel, cobalt, and manganese ions in the nickel-cobalt-manganese metal solution is in a range from 1.0 mol/L to 2.0 mol/L.

In some embodiments of the present disclosure, in step S1, a molar ratio of bismuth or antimony in the mixed salt solution to a total of nickel, cobalt, and manganese is in a range of (2-8): 100.

In some embodiments of the present disclosure, in step S2, the sodium hydroxide solution has a concentration in a range from 4.0 mol/L to 10.0 mol/L.

In some embodiments of the present disclosure, in step S2, the ammonia water has a concentration in a range from 6.0 mol/L to 12.0 mol/L.

In some embodiments of the present disclosure, in step S2, the base solution is a mixed solution of sodium hydroxide and ammonia water, and the base solution has a pH in a range from 10.8 to 11.5 and an ammonia concentration in a range from 2.0 g/L to 5.0 g/L.

In some embodiments of the present disclosure, in step S2, the reaction is conducted at a temperature in a range from 45° C. to 65° C., a pH in a range from 10.8 to 11.5, and an ammonia concentration in a range from 2.0 g/L to 5.0 g/L.

In some embodiments of the present disclosure, in step S2, the reaction product has a target particle size D50 in a range from 2.0 μm to 15.0 μm.

In some embodiments of the present disclosure, in step S3, the molten salt is at least one selected from the group consisting of sodium chloride and potassium chloride.

In some embodiments of the present disclosure, in step S3, the lithium source is LiOH, and a molar ratio of the lithium source to a total of nickel, cobalt and manganese in the precursor is in a range from 1.02 to 1.08.

In some embodiments of the present disclosure, in step S3, a molar ratio of the molten salt to the total of nickel, cobalt and manganese in the precursor is in a range from 4 to 5.

In some embodiments of the present disclosure, in step S3, the sintering may be conducted at a temperature in a range from 800° C. to 900° C. for 12 h to 36 h. Further, the sintering may be conducted at a heating rate in a range from 2° C./min to 5° C./min.

In some embodiments of the present disclosure, in step S3, the ball-milling is conducted for 2 h to 3 h.

In some embodiments of the present disclosure, in step S4, the drying is conducted at a temperature in a range from 80° C. to 120° C. for 2 h to 5 h.

In some embodiments of the present disclosure, in step S4, the annealing is conducted at a temperature in a range from 650° C. to 700° C.

The present disclosure also provides use of the method described above in the preparation of a lithium-ion battery.

According to a preferred embodiment of the present disclosure, the present disclosure at least has the following beneficial effects:

1. In the present disclosure, a bismuth/antimony-doped ternary precursor is first prepared through co-precipitation, and then subjected to sintering with a molten salt to obtain a ternary cathode material. During the sintering, since a bismuth/antimony oxide has a low melting point, the bismuth/antimony oxide doped in the precursor is melted into the molten salt, such that bismuth/antimony is separated from nickel, cobalt and manganese so as to leave atomic vacancies inside lattices, which can effectively buffer a volume change caused by subsequent charge and discharge of the ternary cathode material and improve the cycling stability of the material while further improve a specific capacity of the material. The reaction principles are as follows.

Dissolution of bismuth/antimony oxide in nitric acid:

$$Bi_2O_3+6HNO_3\rightarrow 2Bi(NO_3)_3+3H_2O$$

During co-precipitation reaction:

$$xNi^{2+}+yCo^{2+}+zMn^{2+}+2OH^-\rightarrow Ni_xCo_yMn_z(OH)_2$$

$$Bi^{3+}+3OH^-\rightarrow Bi(OH)_3$$

During sintering with molten salt:

$$4Ni_xCo_yMn_z(OH)_2+O_2+4LiOH\rightarrow 4LiNi_xCo_yMn_zO_2+6H_2O$$

$$2Bi(OH)_3\rightarrow Bi_2O_3+3H_2O$$

2. After the sintering with molten salt, the product is washed with water to remove residual molten salt and bismuth/antimony oxide, and then annealed to form a coating layer on a surface of the cathode material, which can further improve the cycling performance of the cathode material.

BRIEF DESCRIPTION OF THE DRAWINGS

The present disclosure is further described below with reference to accompanying drawings and examples.

The sole FIGURE is a scanning electron microscopy (SEM) image of the ternary cathode material prepared in Example 1 of the present disclosure.

DETAILED DESCRIPTION

The concepts and technical effects of the present disclosure are clearly and completely described below in conjunction with examples, such as to allow the objectives, features, and effects of the present disclosure to be fully understood. Apparently, the described examples are merely some rather than all of the examples of the present disclosure. All other examples obtained by those skilled in the art based on the examples of the present disclosure without creative efforts should fall within the protection scope of the present disclosure.

Example 1

A method for preparing a ternary cathode material with a molten salt was provided, and a specific preparation process was as follows.

Step 1. Nickel nitrate, cobalt nitrate, and manganese nitrate, as raw materials, were weighed out in a molar ratio of nickel to cobalt to manganese of 8:1:1 to prepare a nickel-cobalt-manganese metal solution, wherein a total concentration of metal ions in the nickel-cobalt-manganese metal solution was 1.0 mol/L.

Step 2. Bismuth trioxide and nitric acid with a mass concentration of 40% were added to the nickel-cobalt-manganese metal solution, and a resulting mixture was thoroughly stirred until the solid was completely dissolved so as to obtain a mixed salt solution, wherein a molar ratio of bismuth to a total of nickel, cobalt and manganese was 5:100.

Step 3. A sodium hydroxide solution with a concentration of 8.0 mol/L was prepared.

Step 4. Ammonia water with a concentration of 8.0 mol/L was prepared as a complexing agent.

Step 5. A base solution (the base solution being a mixed solution of sodium hydroxide and ammonia water, and having a pH of 11.0 and an ammonia concentration of 4.0 g/L) was added to a reactor until a stirring paddle at a bottom was immersed, and stirring was started.

Step 6. The mixed salt solution, the sodium hydroxide solution and the ammonia water were concurrently fed into the reactor to allow a reaction at a temperature of 55° C., a pH of 11.0, and an ammonia concentration of 4.0 g/L.

Step 7. When it was detected that D50 of a product in the reactor reached 5.0 μm, the feeding was stopped.

Step 8. A reaction material in the reactor was subjected to solid-liquid separation, and a resulting solid product was washed with pure water.

Step 9. The washed solid product was dried, sieved and demagnetized to obtain a bismuth-doped ternary cathode material precursor.

Step 10. LiOH and a molten salt (composed of 60% of potassium chloride and 40% of sodium chloride, in mass percentage) were weighed out and mixed with the precursor obtained in step 9 to obtain a mixture, wherein a molar ratio of LiOH to a total of nickel, cobalt and manganese was 1.05, and a molar ratio of the molten salt to the total of nickel, cobalt and manganese was 5.

Step 11. The mixture was milled on a planetary ball mill for 3 h, then heated to 850° C. at a heating rate of 3° C./min and roasted for 24 h in an oxygen atmosphere, and then naturally cooled to room temperature.

Step 12. A roasted material was washed with deionized water to remove the residual molten salt, and then dried at 100° C. for 4 h.

Step 13. A dried material was annealed at 700° C., grinded and sieved, and subjected to iron removal to obtain the ternary cathode material.

Appearance of particles of the material was shown in the sole FIGURE, and a particle size D50 of the material determined by a laser particle analyzer was 4.0 μm.

Example 2

A method for preparing a ternary cathode material with a molten salt was provided, and a specific preparation process was as follows.

Step 1. Nickel nitrate, cobalt nitrate, and manganese nitrate, as raw materials, were weighed out in a molar ratio of nickel to cobalt to manganese of 6:2:2 to prepare a nickel-cobalt-manganese metal solution, wherein a total concentration of metal ions in the nickel-cobalt-manganese metal solution was 2.0 mol/L.

Step 2. Antimony trioxide and nitric acid with a mass concentration of 40% were added to the nickel-cobalt-manganese metal solution, and a resulting mixture was thoroughly stirred until the solid was completely dissolved so as to obtain a mixed salt solution, wherein a molar ratio of antimony to a total of nickel, cobalt and manganese was 2:100.

Step 3. A sodium hydroxide solution with a concentration of 10.0 mol/L was prepared.

Step 4. Ammonia water with a concentration of 12.0 mol/L was prepared as a complexing agent.

Step 5. A base solution (the base solution being a mixed solution of sodium hydroxide and ammonia water, and having a pH of 11.5 and an ammonia concentration of 5.0 g/L) was added to a reactor until a stirring paddle at a bottom was immersed, and stirring was started.

Step 6. The mixed salt solution, the sodium hydroxide solution and the ammonia water were concurrently fed into the reactor to allow a reaction at a temperature of 65° C., a pH of 11.5, and an ammonia concentration of 5.0 g/L.

Step 7. When it was detected that D50 of a product in the reactor reached 2.0 μm, the feeding was stopped.

Step 8. A reaction material in the reactor was subjected to solid-liquid separation, and a resulting solid product was washed with pure water.

Step 9. The washed solid product was dried, sieved and demagnetized to obtain an antimony-doped ternary cathode material precursor.

Step 10. LiOH and a molten salt (potassium chloride) were weighed out and mixed with the precursor obtained in step 9 to obtain a mixture, wherein a molar ratio of LiOH to a total of nickel, cobalt and manganese was 1.02, and a molar ratio of the molten salt to the total of nickel, cobalt and manganese was 4.

Step 11. The mixture was milled on a planetary ball mill for 3 h, then heated to 800° C. at a heating rate of 5° C./min and roasted for 36 h in an oxygen atmosphere, and then naturally cooled to room temperature.

Step 12. A roasted material was washed with deionized water to remove the residual molten salt, and then dried at 120° C. for 2 h.

Step 13. A dried material was annealed at 650° C., grinded and sieved, and subjected to iron removal to obtain the ternary cathode material. A particle size D50 of the material determined by a laser particle analyzer was 4.5 μm.

Example 3

A method for preparing a ternary cathode material with a molten salt was provided, and a specific preparation process was as follows.

Step 1. Nickel nitrate, cobalt nitrate, and manganese nitrate, as raw materials, were weighed out in a molar ratio of nickel to cobalt to manganese of 5:2:3 to prepare a nickel-cobalt-manganese metal solution, wherein a total concentration of metal ions in the nickel-cobalt-manganese metal solution was 1.5 mol/L.

Step 2. Bismuth trioxide and nitric acid with a mass concentration of 40% were added to the nickel-cobalt-manganese metal solution, and a resulting mixture was thoroughly stirred until the solid was completely dissolved so as to obtain a mixed salt solution, wherein a molar ratio of bismuth to a total of nickel, cobalt and manganese was 8:100.

Step 3. A sodium hydroxide solution with a concentration of 4.0 mol/L was prepared.

Step 4. Ammonia water with a concentration of 6.0 mol/L was prepared as a complexing agent.

Step 5. A base solution (the base solution being a mixed solution of sodium hydroxide and ammonia water, and having a pH of 10.8 and an ammonia concentration of 2.0 g/L) was added to a reactor until a stirring paddle at a bottom was immersed, and stirring was started.

Step 6. The mixed salt solution, the sodium hydroxide solution and the ammonia water were concurrently fed into the reactor to allow a reaction at a temperature of 45° C., a pH of 10.8, and an ammonia concentration of 2.0 g/L.

Step 7. When it was detected that D50 of a product in the reactor reached 15.0 μm, the feeding was stopped.

Step 8. A reaction material in the reactor was subjected to solid-liquid separation, and a resulting solid product was washed with pure water.

Step 9. The washed solid product was dried, sieved and demagnetized to obtain a bismuth-doped ternary cathode material precursor.

Step 10. LiOH and a molten salt (composed of 50% of potassium chloride and 50% of sodium chloride, in mass percentage) were weighed out and mixed with the precursor obtained in step 9 to obtain a mixture, wherein a molar ratio of LiOH to a total of nickel, cobalt and manganese was 1.08, and a molar ratio of the molten salt to the total of nickel, cobalt and manganese was 5.

Step 11. The mixture was milled on a planetary ball mill for 2 h, then heated to 900° C. at a heating rate of 5° C./min and roasted for 12 h in an oxygen atmosphere, and then naturally cooled to room temperature.

Step 12. A roasted material was washed with deionized water to remove the residual molten salt, and then dried at 80° C. for 5 h.

Step 13. A dried material was annealed at 700° C., grinded, sieved, and subjected to iron removal to obtain the ternary cathode material. A particle size D50 of the material determined by a laser particle analyzer was 16.6 μm.

Comparative Example 1

In this comparative example, a ternary cathode material was prepared in the same way as in Example 1, except that the precursor was not doped with bismuth trioxide. A specific preparation process was as follows.

Step 1. Nickel nitrate, cobalt nitrate, and manganese nitrate, as raw materials, were weighed out in a molar ratio of nickel to cobalt to manganese of 8:1:1 to prepare a nickel-cobalt-manganese metal solution, wherein a total concentration of metal ions in the nickel-cobalt-manganese metal solution was 1.0 mol/L.

Step 2. A sodium hydroxide solution with a concentration of 8.0 mol/L was prepared.

Step 3. Ammonia water with a concentration of 8.0 mol/L was prepared as a complexing agent.

Step 4. A base solution (the base solution being a mixed solution of sodium hydroxide and ammonia water, and having a pH of 11.0 and an ammonia concentration of 4.0 g/L) was added to a reactor until a stirring paddle at a bottom was immersed, and stirring was started.

Step 5. The nickel-cobalt-manganese metal solution, the sodium hydroxide solution and the ammonia water were concurrently fed into the reactor to allow a reaction at a temperature of 55° C., a pH of 11.0, and an ammonia concentration of 4.0 g/L.

Step 6. When it was detected that D50 of a product in the reactor reached 5.0 μm, the feeding was stopped.

Step 7. A reaction material in the reactor was subjected to solid-liquid separation, and a resulting solid product was washed with pure water.

Step 8. The washed solid product was dried, sieved, and demagnetized to obtain a ternary cathode material precursor.

Step 9. LiOH and a molten salt (composed of 60% of potassium chloride and 40% of sodium chloride, in mass percentage) were weighed out and mixed with the precursor obtained in step 8 to obtain a mixture, wherein a molar ratio of LiOH to a total of nickel, cobalt and manganese was 1.05, and a molar ratio of the molten salt to the total of nickel, cobalt and manganese was 5.

Step 10. The mixture was milled on a planetary ball mill for 3 h, then heated to 850° C. at a heating rate of 3° C./min and roasted for 24 h in an oxygen atmosphere, and then naturally cooled to room temperature.

Step 11. A roasted material was washed with deionized water to remove the residual molten salt, and then dried at 100° C. for 4 h.

Step 12. A dried material was annealed at 700° C., grinded and sieved, and subjected to iron removal to obtain the ternary cathode material. A particle size D50 of the material determined by a laser particle analyzer was 4.0 μm.

Comparative Example 2

In this comparative example, a ternary cathode material was prepared in the same way as Example 2, except that the precursor was not doped with antimony trioxide. A specific preparation process was as follows.

Step 1. Nickel nitrate, cobalt nitrate, and manganese nitrate, as raw materials, were weighed out in a molar ratio of nickel to cobalt to manganese of 6:2:2 to prepare a nickel-cobalt-manganese metal solution, wherein a total concentration of metal ions in the nickel-cobalt-manganese metal solution was 2.0 mol/L.

Step 2. A sodium hydroxide solution with a concentration of 10.0 mol/L was prepared.

Step 3. Ammonia water with a concentration of 12.0 mol/L was prepared as a complexing agent.

Step 4. A base solution (the base solution being a mixed solution of sodium hydroxide and ammonia water, and having a pH of 11.5 and an ammonia concentration of 5.0 g/L) was added to a reactor until a stirring paddle at a bottom was immersed, and stirring was started.

Step 5. The nickel-cobalt-manganese metal solution, the sodium hydroxide solution and the ammonia water were concurrently fed into the reactor to allow a reaction at a temperature of 65° C., a pH of 11.5, and an ammonia concentration of 5.0 g/L.

Step 6. When it was detected that D50 of a product in the reactor reached 2.0 μm, the feeding was stopped.

Step 7. A reaction material in the reactor was subjected to solid-liquid separation, and a resulting solid product was washed with pure water.

Step 8. The washed solid product was dried, sieved, and demagnetized to obtain a ternary cathode material precursor.

Step 9. LiOH and a molten salt (potassium chloride) were weighed out and mixed with the precursor obtained in step 8 to obtain a mixture, wherein a molar ratio of LiOH to a total of nickel, cobalt and manganese was 1.02, and a molar ratio of the molten salt to the total of nickel, cobalt and manganese was 4.

Step 10. The mixture was milled on a planetary ball mill for 3 h, then heated to 800° C. at a heating rate of 5° C./min and roasted for 36 h in an oxygen atmosphere, and then naturally cooled to room temperature.

Step 11. A roasted material was washed with deionized water to remove the residual molten salt, and then dried at 120° C. for 2 h.

Step 12. A dried material was annealed at 650° C., grinded, sieved, and subjected to iron removal to obtain the ternary cathode material. A particle size D50 of the material determined by a laser particle analyzer was 4.5 μm.

Comparative Example 3

In this comparative example, a ternary cathode material was prepared in the same way as Example 3, except that the precursor was not doped with bismuth trioxide. A specific preparation process was as follows.

Step 1. Nickel nitrate, cobalt nitrate, and manganese nitrate, as raw materials, were weighed out in a molar ratio of nickel to cobalt to manganese of 5:2:3 to prepare a nickel-cobalt-manganese metal solution, wherein a total concentration of metal ions in the nickel-cobalt-manganese metal solution was 1.5 mol/L.

Step 2. A sodium hydroxide solution with a concentration of 4.0 mol/L was prepared.

Step 3. Ammonia water with a concentration of 6.0 mol/L was prepared as a complexing agent.

Step 4. A base solution (the base solution being a mixed solution of sodium hydroxide and ammonia water, and having a pH of 10.8 and an ammonia concentration of 2.0 g/L) was added to a reactor until a stirring paddle at a bottom was immersed, and stirring was started.

Step 5. The nickel-cobalt-manganese metal solution, the sodium hydroxide solution and the ammonia water were concurrently fed into the reactor to allow a reaction at a temperature of 45° C., a pH of 10.8, and an ammonia concentration of 2.0 g/L.

Step 6. When it was detected that D50 of a product in the reactor reached 15.0 μm, the feeding was stopped.

Step 7. A reaction material in the reactor was subjected to solid-liquid separation, and a resulting solid product was washed with pure water.

Step 8. The washed solid product was dried, sieved and demagnetized to obtain a ternary cathode material precursor.

Step 9. LiOH and a molten salt (composed of 50% of potassium chloride and 50% of sodium chloride, in mass percentage) were weighed out and mixed with the precursor obtained in step 8 to obtain a mixture, wherein a molar ratio of LiOH to a total of nickel, cobalt and manganese was 1.08, and a molar ratio of the molten salt to the total of nickel, cobalt and manganese was 5.

Step 10. The mixture was milled on a planetary ball mill for 2 h, then heated to 900° C. at a heating rate of 5° C./min and roasted for 12 h in an oxygen atmosphere, and then naturally cooled to room temperature.

Step 11. A roasted material was washed with deionized water to remove the residual molten salt, and then dried at 80° C. for 5 h.

Step 12. A dried material was annealed at 700° C., grinded and sieved, and subjected to iron removal to obtain the ternary cathode material. A particle size D50 of the material determined by a laser particle analyzer was 16.6 km.

Test Example

A cathode material prepared in each of the examples and comparative examples was assembled a button battery, and the battery was subjected to an electrochemical performance test. Specifically, by using N-methylpyrrolidone (NMP) as a solvent, a cathode active material, acetylene black and polyvinylidene fluoride (PVDF) were thoroughly mixed in a mass ratio of 8:1:1, coated on an aluminum foil, blow-dried at 80° C. for 8 h, and then vacuum-dried at 120° C. for 12 h. A battery was assembled in an argon-protected glove box, with a lithium metal sheet as an anode, a polypropylene (PP) membrane as a separator, and 1 M LiPF6-EC/DMC (1:1, v/v) as an electrolyte. The cycling performance was tested at a charge/discharge cut-off voltage in a range from 2.7 V to 4.3 V and a rate of 0.1 C, and test results were shown in Table 1.

TABLE 1

| | Discharge capacity at 0.1 C, mAh/g | Specific discharge capacity after 100 cycles, mAh/g | Cycling retention |
|---|---|---|---|
| Example 1 | 205.8 | 193.2 | 93.9% |
| Comparative Example 1 | 202.1 | 176.3 | 87.2% |
| Example 2 | 182.2 | 172.3 | 94.6% |
| Comparative Example 2 | 178.0 | 158.9 | 89.3% |
| Example 3 | 168.7 | 162.6 | 96.4% |
| Comparative Example 3 | 163.4 | 152.3 | 93.2% |

It can be seen from Table 1 that the specific capacity and cycling performance of a cathode material in each example are superior to those of the corresponding comparative example. This is because the precursor in each example is doped with bismuth/antimony, and the bismuth/antimony oxide is melted in a molten salt during sintering with molten salt, such that atomic vacancies are left in lattices, which can effectively buffer a volume change caused by subsequent charge and discharge of the ternary cathode material and improve the cycling stability of the material, while further improve a specific capacity of the material. In addition, the residual bismuth/antimony oxide in the roasted material after washing with water is formed to a coating layer through annealing, which will further improve the cycling performance of the cathode material.

The examples of the present disclosure are described in detail with reference to the accompanying drawings, but the present disclosure is not limited to the above examples. Within the scope of knowledge possessed by those of ordinary skill in the technical field, various changes can also be made without departing from the purpose of the present disclosure. In addition, the examples in the present disclosure and features in the examples may be combined with each other in a non-conflicting situation.

The invention claimed is:

1. A method for preparing a ternary cathode material with a molten salt, comprising the following steps:

S1: mixing a nickel salt, a cobalt salt, a manganese salt, a metal oxide and an acid liquor to obtain a mixed salt solution, wherein the metal oxide is an oxide of bismuth or an oxide of antimony; wherein the acid liquor is nitric acid;

S2: concurrently adding the mixed salt solution, a sodium hydroxide solution and ammonia water to a base solution to allow a reaction, and when a reaction product has a target particle size, conducting solid-liquid separation to obtain a precursor;

S3: mixing the precursor, a lithium source and a molten salt, and subjecting a resulting mixture to ball-milling and then to sintering in an oxygen atmosphere to obtain a sintered material; and S4: subjecting the sintered material to water-washing, drying and annealing, to obtain the ternary cathode material.

2. The method according to claim 1, wherein in step S1, a nickel-cobalt-manganese metal solution containing the nickel salt, the cobalt salt and the manganese salt is first prepared, then the metal oxide and the acid liquor are added into the nickel-cobalt-manganese metal solution, and a total concentration of nickel, cobalt and manganese ions in the nickel-cobalt-manganese metal solution is in a range from 1.0 mol/L to 2.0 mol/L.

3. The method according to claim 1, wherein in step S1, a molar ratio of bismuth or antimony in the mixed salt solution to a total of nickel, cobalt and manganese is in a range of (5-15):100.

4. The method according to claim 1, wherein in step S2, the base solution is a mixed solution of sodium hydroxide and ammonia water, and the base solution has a pH in a range from 10.8 to 11.5 and an ammonia concentration in a range from 2.0 g/L to 5.0 g/L.

5. The method according to claim 1, wherein in step S2, the reaction is conducted at a temperature in a range from 45° C. to 65° C., a pH in a range from 10.8 to 11.5, and an ammonia concentration in a range from 2.0 g/L to 5.0 g/L.

6. The method according to claim 1, wherein in step S3, the molten salt is at least one selected from the group consisting of sodium chloride and potassium chloride.

7. The method according to claim 1, wherein in step S3, a molar ratio of the molten salt to a total of nickel, cobalt and manganese in the precursor is in a range from 4 to 5.

8. The method according to claim 1, wherein in step S3, the sintering is conducted at a temperature in a range from 800° C. to 900° C. for 12 h to 36 h.

9. The method according to claim 1, wherein in step S4, the annealing is conducted at a temperature in a range from 650° C. to 700° C.

* * * * *